(12) United States Patent
Hao et al.

(10) Patent No.: US 11,769,900 B2
(45) Date of Patent: Sep. 26, 2023

(54) LITHIUM ION BATTERY AND PRELITHIATION METHOD OF ANODE

(71) Applicant: Robert Bosch GmbH, Stuttgart (DE)

(72) Inventors: Xiaogang Hao, Shanghai (CN); Rongrong Jiang, Shanghai (CN)

(73) Assignee: Robert Bosch GmbH, Stuttgart (DE)

( * ) Notice: Subject to any disclaimer, the term of this patent is extended or adjusted under 35 U.S.C. 154(b) by 819 days.

(21) Appl. No.: 16/610,779

(22) PCT Filed: May 5, 2017

(86) PCT No.: PCT/CN2017/083159
§ 371 (c)(1),
(2) Date: Nov. 4, 2019

(87) PCT Pub. No.: WO2018/201427
PCT Pub. Date: Nov. 8, 2018

(65) Prior Publication Data
US 2020/0067129 A1    Feb. 27, 2020

(51) Int. Cl.
| | | |
|---|---|---|
| *H01M 8/04* | (2016.01) | |
| *H01M 10/0525* | (2010.01) | |
| *H01M 4/133* | (2010.01) | |
| *H01M 4/134* | (2010.01) | |
| *H01M 10/44* | (2006.01) | |

(52) U.S. Cl.
CPC ....... *H01M 10/0525* (2013.01); *H01M 4/133* (2013.01); *H01M 4/134* (2013.01); *H01M 10/44* (2013.01)

(58) Field of Classification Search
CPC ........... H01M 10/052; H01M 10/0525; H01M 10/44; H01M 10/446; H01M 10/448; H01M 10/443; H01M 4/133; H01M 4/134; H01M 4/136; H01M 4/1393; H01M 4/1395; H01M 4/139
See application file for complete search history.

(56) References Cited

U.S. PATENT DOCUMENTS

| | | | |
|---|---|---|---|
| 2010/0173198 A1* | 7/2010 | Zhamu | H01M 4/38 429/231.95 |
| 2012/0007560 A1 | 1/2012 | Smart et al. | |
| 2015/0364795 A1 | 12/2015 | Stefan et al. | |
| 2018/0301707 A1* | 10/2018 | Pan | H01M 4/628 |

FOREIGN PATENT DOCUMENTS

| | | |
|---|---|---|
| CN | 102376972 A | 3/2012 |
| CN | 103117412 A | 5/2013 |
| CN | 104319422 A | 1/2015 |
| CN | 104584278 A | 4/2015 |
| JP | 2000-149996 A | 5/2000 |
| JP | 2003-022804 A | 1/2003 |
| JP | 2017-50112 A | 3/2017 |
| WO | 2012/047596 A2 | 4/2012 |
| WO | 2014/120718 A1 | 8/2014 |

OTHER PUBLICATIONS

International Search Report corresponding to PCT Application No. PCT/CN2017/083159, dated Jan. 26, 2018 (3 pages).

* cited by examiner

*Primary Examiner* — Raymond Alejandro
(74) *Attorney, Agent, or Firm* — Maginot, Moore & Beck LLP

(57) ABSTRACT

A method for prelithiating an anode of lithium ion batteries includes the following steps: (a) charging the battery to a voltage from about 4.2 to about 4.5 V at a first temperature; and (b) discharging the battery to a voltage from about 2.5 to about 3.2 V at a second temperature which is about 20 to 40° C. lower than the first temperature. Also provided is a lithium ion battery having an anode prelithiated by the method.

8 Claims, 1 Drawing Sheet

LITHIUM ION BATTERY AND PRELITHIATION METHOD OF ANODE

This application is a 35 U.S.C. § 371 National Stage Application of PCT/CN2017/083159, filed on May 5, 2017, the disclosures of which are incorporated herein by reference in their entirety.

The present disclosure relates to a lithium ion battery and a method for prelithiating an anode of lithium ion batteries.

BACKGROUND

Lithium ion batteries have now been widely used in energy storage systems and electric vehicles.

For lithium ion batteries which comprise lithium-containing cathode materials (such as $LiCoO_2$ or $LiNiO_2$), lithium ions move from cathodes to anodes when charging. However, the moving lithium ions inevitably and continuously react with electrolytes. As a result, lithium is undesirably consumed and solid electrolyte interfaces (SEI) are formed on the anodes. The consumed lithium does not return to the cathodes during subsequent discharges, causing fast capacity fading for the lithium ion batteries.

It has been proposed to pre-intercalate lithium from external lithium metal into a coated anode tape so as to prelithiate the anode and compensate the capacity fading. The prelithiated anode is subsequently assembled into a lithium ion battery. However, due to the high activity of the prelithiated anode, the battery production procedures following the prelithiation step require an operating environment with well-controlled humidity, which increases the manufacturing cost of lithium ion batteries.

There is an on-going demand for methods which could provide more attractive and reliable lithium ion batteries.

SUMMARY

The disclosure relates to a method for prelithiating an anode of lithium ion batteries, comprising the following steps:
(a) charging the battery to a voltage from about 4.2 to about 4.5 V at a first temperature; and
(b) discharging the battery to a voltage from about 2.5 to about 3.2 V at a second temperature which is about 20 to 40° C. lower than the first temperature.

In some examples, steps (a) and (b) are alternately conducted for 1 to 3 cycles so as to prelithiate the anode.

In some examples, after the cycles of steps (a) and (b), the method further comprises step (c): charging and discharging the battery within a voltage range from about 2.5 to about 4.5 V at the second temperature during subsequent cycles.

Also provided is a lithium ion battery, comprising an anode prelithiated according to the method of the present disclosure.

By employing the prelithiation method according to the present disclosure, the capacity fading may be compensated, and the battery performances (such as reversible capacity and cycling stability) may be significantly improved.

In addition, as for the known proposal of employing external lithium metal as prelithiation source, additional step of applying the lithium metal is involved, well-controlled assembly condition is required, undesirable explosion risk might occur. In contrast, the prelithiation method of the present disclosure realizes in-situ prelithiation, which is easy and safe to conduct, does not require a special assembly condition, and means considerable cost saving and labor saving for industrial production.

Furthermore, during the first several charge/discharge cycles, by making the first temperature higher than the second temperature, the amount of lithium that is extracted from the cathode and inserted into the anode is higher than that deserted from the anode. As a result, additional lithium is stored in the anode and the anode is prelithiated. Meanwhile, by adjusting the difference between the first temperature and the second temperature, the degree of prelithiation is controllable.

BRIEF DESCRIPTION OF THE DRAWINGS

Additional features and advantages of the disclosure will be apparent from the detailed description which follows, taken in conjunction with the accompanying drawings, which together illustrate, by way of example, features of the technology; and, wherein.

DETAILED DESCRIPTION

Figure 1:
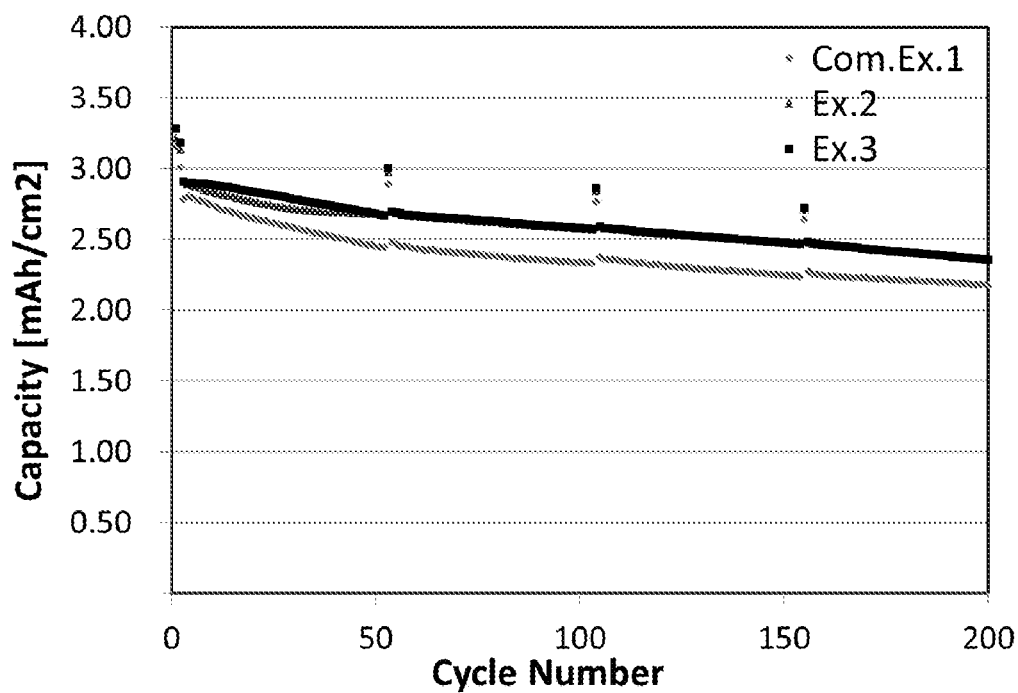
FIG. 1 compares cycling performances of cells charged/discharged according to Examples of the present disclosure and a Comparative Example.

Reference will now be made to some illustrative examples, and specific language will be used herein to describe the same. It will nevertheless be understood that no limitation of the scope of the disclosure is thereby intended.

Throughout this disclosure, all the scientific and technical terms, unless otherwise indicated, shall have the same meanings as those known to a person skilled in the art. Where there is inconsistency, the definition provided in the present disclosure should be taken.

It should be understood that the detailed description of all materials, processes, examples and drawings are presented for the purposes of illustration, and therefore, unless expressly specified otherwise, are not construed as limitations of the present disclosure.

Herein, the terms "cell" and "battery" may be interchangeably used. The term "lithium ion cell (or battery)" may also be abbreviated to "cell" or "battery".

Herein, the term "comprising" means that other ingredients or other steps which do not affect the final effect can be included. This term encompasses the terms "consisting of" and "consisting essentially of". The product and process according to the present disclosure can comprise, consist of, and consist essentially of the essential technical features and/or limitations of the present disclosure described herein, as well as any additional and/or optional ingredients, components, steps, or limitations described herein.

Herein, the term "cathode composition" or "anode composition" intends to mean the composition used to form the cathode slurry or the anode slurry. The cathode slurry or the anode slurry may be subsequently applied onto the corresponding current collector and dried to from the cathode or anode.

The use of the terms "a", "an" and "the" and similar referents in the context of describing the subject matter of this application (especially in the context of the following claims) are to be construed to cover both the singular and the plural, unless otherwise indicated herein or clearly contradicted by context.

The term "room temperature" means about 25° C.

Unless otherwise specified, every numerical range in this context intends to include both endpoints and any numbers and sub-ranges falling within said numerical ranges.

Unless specially indicated, all materials and agents used in the present disclosure are commercially available.

Examples of the present disclosure are described in detail as follows.

Prelithiation Method

In some examples, a method for prelithiating an anode of lithium ion batteries is provided, comprising the following steps:
(a) charging the battery to a voltage from about 4.2 to about 4.5 V at a first temperature; and
(b) discharging the battery to a voltage from about 2.5 to about 3.2 V at a second temperature which is about 20 to 40° C. lower than the first temperature.

In some examples, steps (a) and (b) are alternately conducted for 1 to 3 cycles so as to prelithiate the anode.

By employing the prelithiation method according to the present disclosure, on the one hand, the SEI may be stabilized, the capacity loss fading may be compensated, and the battery performances (such as reversible capacity and cycling stability) may be significantly improved. On the other hand, undesirable lithium dendrite may be avoided.

In addition, as for the known proposal of employing external lithium metal as prelithiation source, additional step of applying the lithium metal is involved, well-controlled assembly condition is required, undesirable explosion risk might occur.

In contrast, the prelithiation method of the present disclosure realizes in-situ prelithiation, which is easy and safe to conduct, does not require a special assembly condition, and means considerable cost saving and labor saving for industrial production.

Furthermore, during the first several charge/discharge cycles, by making the first temperature higher than the second temperature, the amount of lithium that is extracted from the cathode and inserted into the anode is higher than that deserted from the anode. That's to say, the charge capacity is higher than the discharge capacity. As a result, additional lithium is stored in the anode and the anode is prelithiated. Therefore, the first several charges during which the anode is prelithiated are also referred to as "formation charges", and the first several charge/discharge cycles are referred to as "formation cycles".

Meanwhile, by adjusting the difference between the first temperature and the second temperature, the degree of prelithiation is controllable. When the temperature difference is controlled within the range from 20 to 40° C., the battery may be prelithiated to a desirably high level, but not too high to undesirably promote side reactions between the electrodes and the electrolyte and thicken the SEI layer.

During each charge cycle, the upper limit of the charge voltage is referred to as a cut-off voltage. In some examples, during the formation charges, the cut-off voltage may be no less than about 4.2 V but no more than about 4.5 V. The cut-off voltage during the formation charges may depend on the cathode active material contained in the lithium ion battery. The cathode active material will be described hereinafter. With the cut-off voltage during the formation charges falling within these ranges, on the one hand, the cathode may sufficiently release lithium ions, and on the other hand, the cathode is not seriously destroyed.

In some examples, after the cycles of steps (a) and (b), the method further comprises step (c): charging and discharging the battery within a voltage range from about 2.5 to about 4.5 V at the second temperature during subsequent cycles. During the discharge/charge cycles of step (c), the lithium stored in the anode in the formation charges may take part in lithium ion transference, compensate lithium loss due to the formation of SEI layer, stabilize the SEI layer and reduce the capacity fading.

In some examples, the first temperature is from about 45 to about 65° C., and the second temperature is about 25° C. In the case where the second temperature is equal to or close to room temperature, it is easy to realize and energy saving.

In some examples, the battery is kept at the first temperature for about 3 to 7 hours prior to step (a), preferably for about 4 to about 6 hours, more preferably for about 5 hours. In some examples, the battery is placed in a thermostat chamber so as to reach and keep the first temperature. The first temperature in step (a) may be ensured by this preheating step.

In some examples, relative to the reversible lithium amount in the anode of the same battery which is not subjected to steps (a) and (b), additional 5 to 25% by weight, preferably 10 to 20% by weight of lithium is stored in the anode. When the additional lithium amount stored by the prelithiation steps (a) and (b) is controlled within the range from 5 to 25% by weight, the battery may be prelithiated to a desirably high level, and meanwhile avoid introducing too much lithium and decreasing the mass density of the battery.

In some examples, excluding the additional lithium stored in the anode during the prelithiation, the reversible capacity (unit: $mAh/cm^2$) of the anode that is available for lithium insertion is from about 1 to about 1.3 times, preferably from about 1.05 to about 1.25 times of the reversible capacity (unit: $mAh/cm^2$) of the cathode. Ideally, the ratio of the reversible capacity of the anode to the reversible capacity of the cathode may be 1. Considering that there are inevitable operation errors during preparing the battery, said ratio may be larger than 1. By making the ratio of the reversible capacity of the anode to the reversible capacity of the cathode no less than 1, it may help to avoid excessive lithium metal aggregating around the anode to form lithium dendrites and cause short circuit. By making the ratio of the reversible capacity of the anode to the reversible capacity of the cathode is no more than 1.3, the anode capacity is not too large to excessively consume the anode reversible capacity.

According to some examples of the present disclosure, the anode may be partially prelithiated, so as to not only compensate the lithium loss due to the formation of SEI, but also retain desirable lithium transference between the cathode and the anode.

Lithium Ion Battery

In some examples, a lithium ion battery is provided, which comprises an anode prelithiated according to the method of the present disclosure. In addition, the lithium ion battery also comprises a cathode and an electrolyte.

The lithium ion batteries according to the present disclosure may be used in energy storage systems and electric vehicles.

Anode

The anode composition according to the present disclosure may comprise an anode active material. There is no specific limitation to the anode active material, and those anode active materials commonly known in lithium ion cells may be used. According to some examples of the present disclosure, the anode active material may be selected from the group consisting of silicon-based active materials, graphite-based active materials and any combination thereof.

"Silicon-based active material" may be an active material containing silicon element. Examples of suitable silicon-based active material may include but is not limited to silicon, silicon alloys, silicon oxides, silicon/carbon composites, silicon oxide/carbon composites and any combination thereof. In some examples, the silicon alloy may comprise silicon and one or more metals selected from the group consisting of Ti, Sn, Al, Sb, Bi, As, Ge and Pb. In some examples, the silicon oxide may be a mixture of more than one oxides of silicon. For example, the silicon oxide may be represented as $SiO_x$, where the average value of x may be from about 0.5 to about 2.

"Graphite-based active material" may be an active material containing graphite. In some examples, graphite may be in the form of graphite powder (e.g., particle size: 2-30 μm).

In some examples, the anode may contain a mixture of a silicon-based active material and a graphite-based active material so as to keep a good balance between excellent battery performances and inhibition of undesirable volume change.

In addition to the anode active material, the anode composition may further comprise a carbon material, a binder and/or a solvent. In addition, other additives commonly known for use in lithium ion batteries may be optionally used, so long as they do not adversely impair the desired performances of the battery.

According to some examples of the present disclosure, the anode composition may further comprise a carbon material. "Carbon material" may be a material containing carbon element. The carbon material may increase the electrical conductivity and/or dispersibility of the anode composition. The carbon material may be identical or different from the graphite-based active material. There is no specific limitation to the carbon material, and those which are known for use in lithium ion batteries may be used. In some examples, the carbon material may include but is not limited to carbon black, acetylene black, Ketjen black, graphite, graphene, carbon nanotubes, carbon fibers, vapour grown carbon fibers, and combination thereof. In some examples, carbon black may be Super P (e.g., Super P commercially available from Timcal, particle size: about 20 nm or about 40 nm). In some examples, graphite may be graphite powder (e.g., particle size: 2-30 μm), and/or graphite flake (e.g., KS6L commercially available from Timcal, particle size: about 6 m). The carbon materials may be used individually or in any combination. The carbon materials may also be used in combination with graphite-based active material and/or silicon-based active material.

In some examples, Super P and graphite flake may be used in a combination. Super P has a relatively smaller particle size and good electrical conductivity, and may improve the one-dimensional electrical conductivity and one-dimensional dispersibility. Graphite flake has a relatively larger particle size and good electrical conductivity, and may improve the two-dimensional electrical conductivity, two-dimensional dispersibility and cycling performance.

According to some examples of the present disclosure, the anode composition may further comprise a binder. The binder may hold the components of the anode composition together and attach the anode composition to the anode current collector, help to retain good stability and integrity of the anode when volume change occurs during repeated charge/discharge cycles, and thus improve the electrochemical properties of the final cells, including cycling performances and rate performances. There is no specific limitation to the binder, and those which are known for use in lithium ion batteries may be used. In some examples, the binder may be polyvinylidene fluoride (PVDF), polyacrylic acid (PAA) and its derivatives (such as LiPAA), sodium carboxymethyl cellulose (CMC) and their combinations.

According to some examples of the present disclosure, the anode compositions may further comprise a solvent. The solvent may dissolve other components of the anode composition to provide an anode slurry. The resultant anode slurry may be subsequently applied onto the anode current collector. Then the anode current collector having the anode slurry applied thereon may be dried to obtain an anode. There is no specific limitation to the solvent contained in the anode composition, and those which are known for use in lithium ion batteries may be used. In some examples, the solvent in the anode composition may be N-methyl-2-pyrrolidone (NMP).

There is no specific limitation to the types, shapes, sizes and/or contents of each component in the anode composition.

There is no specific limitation to the anode current collector. In some examples, nickel foil, a nickel net, copper foil or copper net may be used as the anode current collector.

Cathode

According to some examples of the present disclosure, the cathode may comprise a lithium-based active material. In some examples, the cathode active material may be a material that reversibly deserts and inserts lithium ions during charge/discharge cycles. In discharge cycles, the lithium ions originated from the lithium-based active material can transfer from the anode back to the cathode to form the lithium-based active material again.

There is no specific limitation to the lithium-based cathode active material, and those cathode active materials commonly used in lithium ion cells may be used. In some examples, the cathode active material may be selected from the group consisting of lithium metal oxides, lithium metal phosphates, lithium metal silicates and any combination thereof, preferably lithium-transition metal composite oxides, lithium-transition metal phosphates, lithium metal silicate and any combination thereof. In some examples, the cathode active material may be selected from the group consisting of lithium iron phosphate, lithium manganese phosphate, lithium manganese iron phosphate and any combination thereof. In some examples, the lithium-transition metal composite oxide may be lithium nickel oxide, lithium cobalt oxide, lithium manganese oxide, lithium nickel cobalt oxide, lithium nickel manganese oxide, lithium nickel cobalt manganese oxide (NCM), lithium nickel cobalt aluminum oxide (NCA), lithium nickel cobalt manganese oxide/$Li_2MnO_3$ composite (also referred to as "lithium-riched NCM"), or any combination thereof. Transitional metals may include any transitional metals in group 3 through group 12 of the period table, such as titanium, zinc, copper, nickel, molybdenum.

In some examples, in addition to the lithium-based cathode active material, the cathode composition may further comprise a carbon material, a binder and a solvent. The above description of these substances in anode may also apply here. The carbon material, binder and solvent in the anode may be identical or different from those contained in the anode, respectively. In addition, other additives commonly known for use in lithium ion batteries may be optionally used, so long as they do not adversely impair the desired performances of the battery.

There is no specific limitation to the types, shapes, sizes and/or contents of each component in the cathode composition.

There is no specific limitation to the cathode current collector. In some examples, aluminum foil may be used as the cathode current collector.

Electrolyte

The lithium ion batteries according to the present disclosure may comprise an electrolyte. According to some examples of the present disclosure, the electrolyte may comprise a lithium salt and a non-aqueous solvent. There is no specific limitation to the lithium salt and the non-aqueous solvent, and those lithium salts and non-aqueous solvents commonly known in cells may be used. In some examples, the lithium salt in the electrolyte may be different from the lithium-based active material in the cathode. According to some examples of the present disclosure, the lithium salts may include but are not limited to lithium hexafluorophosphate ($LiPF_6$), lithium tetrafluoroborate ($LiBF_4$), lithium arsenate ($LiAsO_4$), $LiSbO_4$, Lithium perchlorate ($LiClO_4$), $LiAlO_4$, $LiGaO_4$, lithium bis(oxalate)borate (LiBOB) and any combination thereof, with preference being given to $LiPF_6$.

According to some examples of the present disclosure, the non-aqueous solvents may be carbonates (i.e., non-fluorinated carbonates), fluorinated carbonates and combination thereof. According to some examples of the present disclosure, the carbonates may include but are not limited to cyclic carbonates, such as ethylene carbonate (EC), propylene carbonate (PC), butylene carbonate (BC); linear or branched carbonates, such as dimethyl carbonate (DMC), diethyl carbonate (DEC), dipropyl carbonate (DPC), ethyl methyl carbonate (EMC), methylpropyl carbonate (MPC), ethylpropyl carbonate (EPC); and any combination of the aforementioned carbonates. According to some examples of the present disclosure, the fluorinated carbonates may be fluorinated derivatives of the aforementioned carbonates, such as fluoroethylene carbonate (FEC) and difluoroethylene carbonate, difluorinated dimethyl carbonate (DFDMC).

EXAMPLES

Materials

NCM-111: lithium nickel cobalt manganese oxide, active material of the cathode, D50: 12 μm, available from BASF.
Super P: carbon material, conductive material in the cathode and anode, 40 nm, available from Timcal.
PVDF: polyvinylidene fluoride, binder in the cathode, available from Sovey.
Si powders: active material of the anode, diameter: 50 nm, available from 3M.
Graphite powders: active material of the anode, diameter: 20 μm, available from Hitachi.
KS6L: graphite flake, carbon material, conductive material in the anode, about 6 μm, available from Timcal.
LiPAA: lithium salt of polyacrylic acid, binder in the anode, available from Sigma-Aldrich.
NMP: N-methyl-2-pyrrolidone, solvent, available from Guoyao.
Celgard2325: PP/PE/PP membrane, separator, available from Celgard.

Example 1: Preparation of a Cell

Preparation of a Cathode

At room temperature, 965 gNCM-111, 15 g Super P and 20 g PVDF were added into 300 g NMP in a 1 L round bottom flask equipped with a stirrer. After stirring for 3 h, the resultant uniformly-dispersed slurry was coated onto an aluminum foil, then dried at 80° C. for 6 h. The coated Al foil was cut into several Φ12 mm cathodes.

Preparation of an Anode

At room temperature, 40 g Si powders, 40 g graphite powders, 10 g LiPAA, 2 g Super P and 2 g KS6L were added into 100 g deionized water in a 500 mL round bottom flask equipped with a stirrer. After stirring for 3 h, the resultant uniformly-dispersed slurry was coated onto a copper foil, then dried at 60° C. for 6 h. The coated Cu foil was cut into several Φ12 mm anodes.

Preparation of a Cell

Coin cells (CR2016) were assembled in an Argon-filled glovebox (MB-10 compact, MBraun) by using the cathodes and anodes obtained above. 1M $LiPF_6$ in FEC/EC/EMC (30:35:35 by volume) was used as an electrolyte. Celgard 2325 was employed as a separator.

[Electrochemical Measurements]

The battery performances of the cells obtained in Example 1 were measured on an Arbin testing system (Model: Arbin BT-G; Supplier: Arbin).

Example 2 (Ex. 2)

A coin cell obtained in Example 1 was placed into a temperature chamber (VT 3050, available from Voetsch). The temperature was raised to 45° C. and kept for 5 hours. Then the cell was charged at 45° C. to 4.2 V (vs Li/Li$^+$) at a current of 0.1 C for the $1^{st}$ charge cycle. Subsequently, the cell was taken out of the temperature chamber and cooled down to room temperature (25° C.). Then the cell was discharged at 25° C. to 2.5 V at a current of 0.1 C for the $1^{st}$ discharge cycle. The aforementioned charge/discharge cycles was repeated in the $2^{nd}$ and $3^{rd}$ cycles. During the $4^{th}$ to $200^{th}$ cycles, the cell was charged/discharged at 25° C. within a normal voltage range from 2.5 to 4.2V at a current of 0.5 C. The mass loading of NCM in each cathode of the cells is about 10 mg/cm$^2$. The specific capacities were calculated on the basis of the weight of NCM.

Example 3 (Ex. 3)

A coin cell was charged/discharged in the way as described above for Example 1, except that before charging, the temperature was raised to 65° C. and kept for 5 hours. Then the cell was charged at 65° C. to 4.2 V (vs Li/Li$^+$) at a current of 0.1 C during the $1^{st}$ to $3^{rd}$ charge cycles.

Comparative Example 1 (Com. Ex. 1)

A coin cell was charged/discharged in the way as described above for Comparative Example 1, except that the cell was directly charged at 25° C. to 4.2 V (vs Li/Li$^+$) at a current of 0.1 C for the $1^{st}$ charge cycle, without preheating the cell to 45° C. In other words, the cell was charged/discharged at 25° C. within a voltage range from 2.5 to 4.2V during the $1^{st}$ to $200^{th}$ cycles.

FIG. 1 compares cycling performances of cells charged/discharged according to Example 2, Example 3 and Comparative Example 1.

Figure 2:
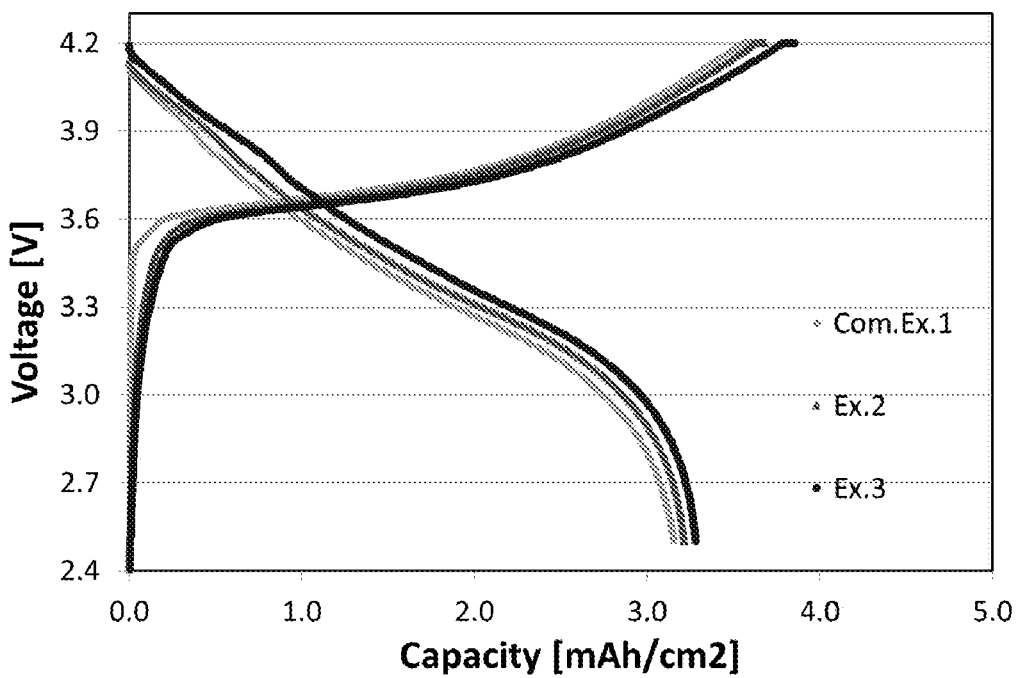
FIG. 2 compares discharge/charge profiles of cells charged/discharged according to Examples of the present disclosure and a Comparative Example.

FIG. 2 compares discharge/charge profiles of cells charged/discharged according to Example 2, Example 3 and Comparative Example 1.

By referring to FIGS. 1 and 2, it can be seen that compared with the cell in Comparative Example 1 charged/discharged in a conventional way without prelithiation, the cells prelithiated by raising the temperature of the 1st to 3rd charges in Examples 2 and 3 showed better capacities and better stabilities.

The invention claimed is:

1. A method for prelithiating an anode of a lithium ion battery, comprising:
charging the lithium ion battery to a first voltage of from 4.2 V to 4.5 V at a first temperature; and
discharging the lithium ion battery to a second voltage from 2.5 V to 3.2 V at a second temperature, which is 20° C. to 40° C. lower than the first temperature in order to prelithiate the anode of the lithium ion battery,
wherein relative to a reversible lithium amount in the anode of the lithium ion battery which is not charged to the first voltage and discharged to the second voltage, the prelithiated anode of the lithium ion battery stores additional lithium, and
wherein the additional lithium is 5% to 25% by weight of the anode of the lithium ion battery.

2. The method according to claim 1, further comprising:
alternately charging the lithium ion battery to the first voltage at the first temperature and discharging the lithium ion battery to the second voltage at the second temperature for 1 to 3 cycles.

3. The method according to claim 1, further comprising:
after charging the lithium ion battery to the first voltage and discharging the lithium ion battery to the second voltage, charging and discharging the lithium ion battery within a voltage range of from 2.5 V to 4.5 V at the second temperature during subsequent cycles.

4. The method according to claim 1, wherein the first temperature is from 45° C. to 65° C., and the second temperature is 25° C.

5. The method according to claim 1, further comprising:
prior to the charging of the lithium ion battery to the first voltage, maintaining the lithium ion battery at the first temperature for 3 to 7 hours.

6. The method according to claim 1, wherein excluding the additional lithium, a reversible capacity of the anode of the prelithiated lithium ion battery is from 1 to 1.3 times a reversible capacity of a cathode of the lithium ion battery.

7. The method according to claim 5, wherein the maintaining of the lithium ion battery at the first temperature is performed in a thermostat chamber.

8. The method according to claim 6, wherein, excluding the additional lithium, the reversible capacity of the prelithiated anode of the lithium ion battery is from 1.05 to 1.25 times the reversible capacity of the cathode of the lithium ion battery.

* * * * *